United States Patent
Tawfik et al.

[15] 3,650,628
[45] Mar. 21, 1972

[54] RANGE SYSTEM

[72] Inventors: David A. Tawfik, Rego Park, N.Y.; Roger J. Talish, Wayne; John F. Yurasek, Oakland, both of N.J.

[73] Assignee: The Bendix Corporation

[22] Filed: Mar. 9, 1970

[21] Appl. No.: 17,036

Related U.S. Application Data

[63] Continuation of Ser. No. 763,866, Sept. 30, 1968, abandoned.

[52] U.S. Cl. ............................ 356/4, 343/13 R, 343/7 RS, 356/5
[51] Int. Cl. ............................................................. G01c 3/08
[58] Field of Search ............... 343/13 R, 12 R, 14 R, 7 RS; 356/4, 5

[56] References Cited

UNITED STATES PATENTS

| | | | |
|---|---|---|---|
| 3,064,250 | 11/1962 | Close | 343/7 RS |
| 3,151,322 | 9/1964 | Hildebrandt | 343/7 RS |
| 3,460,137 | 8/1969 | Ralston | 343/7 RS |
| 3,409,368 | 11/1968 | Pernandez | 356/5 |

Primary Examiner—Rodney D. Bennett, Jr.
Assistant Examiner—S. C. Buczinski

[57] ABSTRACT

A system for converting the interval between signals fired at a target and corresponding rebound signals therefrom to a full scale target range indicating and to an expanded scale indication showing target range to a preset range point. Means are included for eliminating the effect of missing or false rebound signals, increasing noise immunization and for initiating a weapons release command.

9 Claims, 1 Drawing Figure

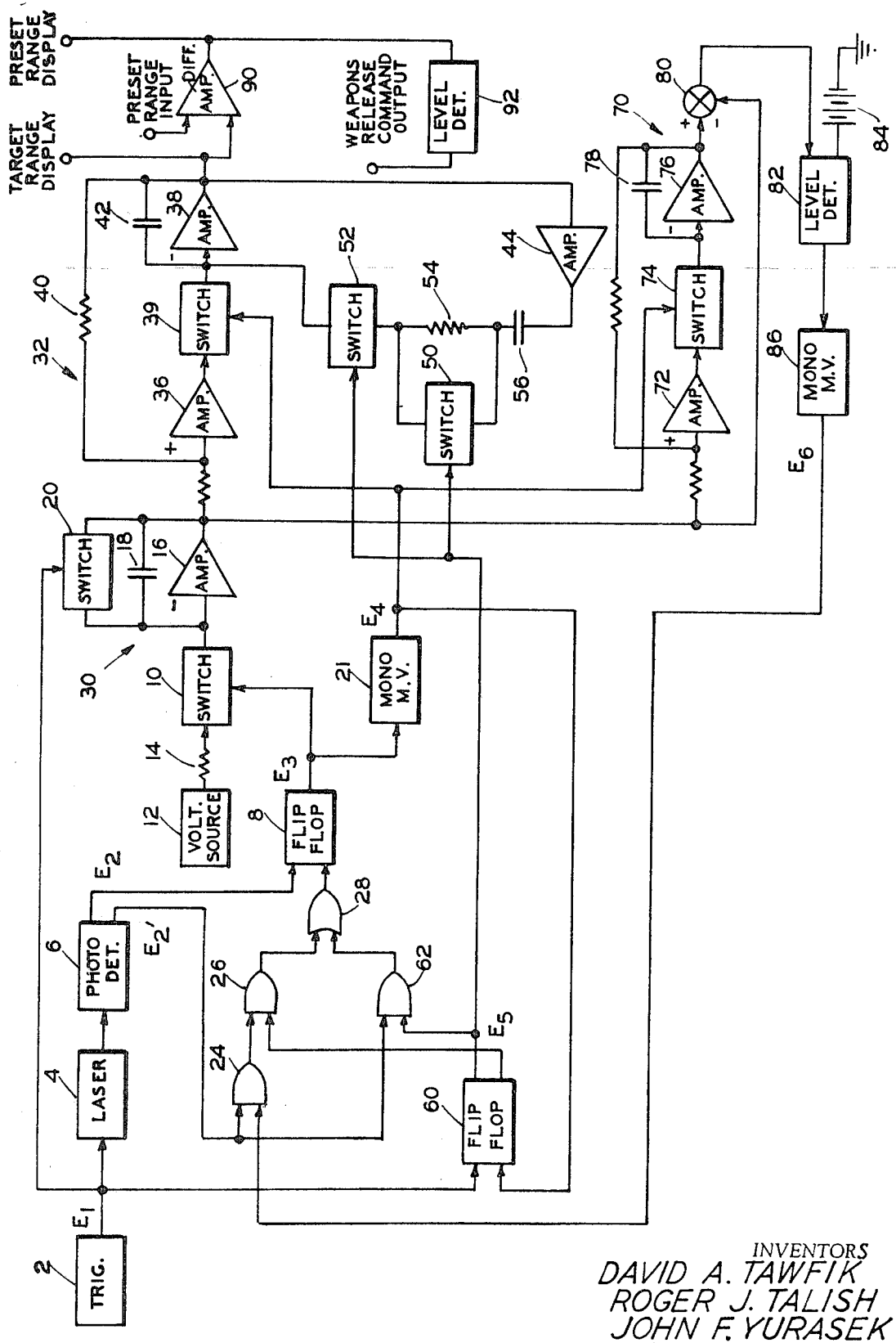

RANGE SYSTEM

CROSS REFERENCE TO RELATED APPLICATIONS

The system of the present invention is a continuation of Ser. No. 763,866 filed Sept. 30, 1968, now abandoned, and an improvement over the system disclosed and claimed in copending U.S. application, Ser. No. 782,378 filed Dec. 9, 1968 by Arthur Simon and John Yurasek and assigned to The Bendix Corporation, assignee of the present invention.

BACKGROUND OF THE INVENTION

1. Field of the Invention

This invention relates to systems for indicating target range and particularly to systems using signals fired at a target and corresponding rebound signals such as may be provided, for example, when a laser device is used for aircraft navigation or ballistics purposes. More particularly, this invention relates to means for increasing the accuracy of systems of the type described.

2. Description of the Prior Art

Prior to the present invention systems using signals fired at a target and corresponding rebound signals for providing aircraft navigation or weapons release data suffered inaccuracies due to missing or false rebound signals and were susceptible to extraneous electrical noise.

SUMMARY OF THE INVENTION

The system of the present invention includes an integrator for converting the interval between signals fired at a target and corresponding rebound signals into a ramp output proportional to target range. Means including a first order hold circuit are provided for updating the integrator output and a zero order hold circuit provides noise immunization when the integrator output is being updated. A signal corresponding to a predetermined range is subtracted from the updated target range signal and when the difference between the signals equals zero a weapons release command signal is initiated.

One object of this invention is to provide a system for converting the interval between signals fired at a target and corresponding rebound signals from the target to a target range display.

Another object of this invention is to include in a system of the type described means for eliminating the effect of missing or false rebound signals.

Another object of this invention is to provide means for decreasing system degradation due to high frequency noise.

Another object of this invention is to include in a system of the type described weapons release capability.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention. For example, although the invention is described as using a laser device, any other device for providing signals for firing at a target may be used as well.

DESCRIPTION OF THE DRAWINGS

The single FIGURE in the drawing is a block diagram of a range system according to the invention.

DESCRIPTION OF THE INVENTION

A trigger 2 which may be, for purposes of example, a unijunction transistor oscillator operating at an adjustable frequency of 1 to 4 cycles per second, provides a basic system timing pulse $E_1$. Pulse $E_1$ is applied to a laser device 4 which is mounted on an aircraft and bore-sighted with the longitudinal axis of the craft for aiming at a predetermined target. It is desired to determine the range of the target for navigation or ballistics purposes.

Several microseconds after laser device 4 receives pulse $E_1$, the laser device fires at the target and a sample of the firing energy is sensed by a photodetector 6 which may be, for purposes of example, a solid state photodiode or a photomultiplier tube for providing a laser firing pulse $E_2$. The laser energy strikes the target and rebounds therefrom so that several microseconds later the laser return energy is sensed by photodetector 6 for providing a rebound pulse $E_2'$.

Laser firing pulse $E_2$ is applied to a flip-flop 8 and sets the flip-flop for providing a pulse $E_3$. Pulse $E_3$ is applied to a normally open switch 10 and is applied to a monostable multivibrator 21. A temperature controlled voltage source 12 is connected through a resistor 14 and through switch 10 to an inverting amplifier 16. Amplifier 16 has a capacitor 18 connected in one feedback path and a normally open switch 20 connected in another feedback path for providing an integrator designated generally by the numeral 30. Pulse $E_3$ closes switch 10 whereupon capacitor 18 charges to the level of the voltage from voltage source 12 at a rate $(V_{12})/(R_{14}C_{18})$.

Laser return pulse $E_2'$ is applied through a gate 24, a gate 26 and a gate 28 to flip-flop 8 and resets the flip-flop for terminating pulse $E_3$ whereupon monostable multivibrator 21 is enabled for providing a pulse $E_4$ and switch 10 is opened causing capacitor 18 to hold a voltage proportional to range for a predetermined sampling interval. If return pulse $E_2'$ is not received for any reason or is not provided during the predetermined interval as will be hereinafter explained, flip-flop 8 will not be reset and sampling will not be initiated. When the sampling interval ends pulse $E_1$ from trigger 2, which is applied to switch 20, closes switch 20 which discharges capacitor 18 until another lasing cycle is initiated.

Integrator 30 is connected to a first order hold circuit designated generally by the numeral 32 and including an amplifier 36 connected to amplifier 16 of integrator 30 and an inverting amplifier 38 connected through a normally open switch 39 to amplifier 36. A capacitor 42 is connected in feedback relation to amplifier 38 and amplifier 38 is connected in feedback relation through a resistor 40 to amplifier 36. An amplifier 44 is connected in feedback relation through a normally closed switch 52, a resistor 54 and a capacitor 56 to amplifier 38 and a normally open switch 50 is connected across resistor 54.

The operation of hold circuit 32 is described at page 423, Section 10–16, of *Electronic Analog and Hybrid Computers*, Korn and Korn, McGraw-Hill, 1964. It will suffice to say for purposes of describing the present invention that hold circuit 32 is a device which implements the first two terms of the Gregory-Newton extrapolation formula. The output of such a circuit is as follows:

$$f(nT+t) = \frac{f(nT) + f(nT) - f[(n-1)T]}{T} t, \quad (1)$$

where $T$ is the sampling period, $nT$ is any particular sampling instant and $t$ is the time measured from that instant. The extrapolation is accomplished by the positive feedback through amplifier 44 to inverting amplifier 38.

It is to be understood that the extrapolation is taken from time $nT$ onward. From equation (1) it is seen that the data needed to implement the extrapolation includes the value of $f(t)$ at two sampling instants $nT$ and $(n-1)T$. These values are provided by integrator 30. In carrying out the extrapolation of a time function, it is necessary to make an assumption as to the form of the function itself. A first order hold circuit assumes linear changes between one sampling interval and the next. The expression in equation (1) shows that the extrapolated function in a particular sampling interval is linear and that the slope of the extrapolated function is equal to the difference between the most recent sample and a previous sample divided by the sampling time interval.

First order data hold circuit 32 is implemented as shown in the drawing and wherein switch 39 is closed by pulse $E_4$ from monostable multivibrator 21 whereupon the output of integrator 30 is applied to hold circuit 32 and sampling begins.

Capacitor 42 connected in feedback relation to amplifier 38 in hold circuit 32 as heretofore noted charges to the output of integrator 30 applied through a low impedance source provided by amplifier 36. The voltage level of capacitor 42 is controlled by the unity gain negative feedback loop around amplifiers 36 and 38.

When pulse $E_4$ terminates switch 39 opens and capacitor 42 holds whatever voltage has accumulated during the sampling period. Therefore, at any particular sampling instant $nT$, $E_o(nT) = -E_i(nT)$, wherein $E_o$ is the output and $E_i$ the input, respectively, to hold circuit 32.

As indicated in *Electronic Analog and Hybrid Computers*, supra, if the gain of amplifier 44 equals $C_{42}/C_{56}$, and $T = R_{54} C_{56}$, it can be shown that the output of hold circuit 32 is as follows:

$$E_o(nT+t) = -\left[E_i(nT) + \frac{1}{T}[E_i(nT) - E_i[(n-1)T]]t\right] \quad (2)$$

Equation (2) is identical to equation (1) except for the inversion. Therefore, the first order form of the Gregory-Newton extrapolation equation is satisfied with hold circuit 32 as described.

A difficulty arises in that when lasing is initiated at relatively long ranges the system will detect a large change in range at the first sampling interval. This results in the extrapolation of equally large changes in subsequent sampling intervals and five or six sampling intervals are required before the system adjusts. This difficulty is overcome by using switches 50 and 52 as shown in the drawing to provide initial condition logic for correct range measurement after the first rebound pulse $E_2'$ occurs.

Pulse $E_1$ from trigger 2 is applied to a flip-flop 60 for setting the flip-flop and for providing a pulse $E_5$. Pulse $E_5$ is applied to gate 26 for disabling gate 26 and to a gate 62 for enabling gate 62 which allows flip-flop 8 to be reset by rebound pulse $E_2'$. Flip-flop 60 is reset by pulse $E_4$ from monostable multivibrator 21.

Pulse $E_5$ from flip-flop 60 is applied to switches 50 and 52 for opening switch 52 to ground and for closing switch 50. Resistor 54 is shorted for a period that starts when lasing is initiated and ends when the first sampling is completed. In this manner, capacitor 42 charges to a voltage corresponding to initial range and a condition is established on capacitor 56 proportional to initial range. This makes first order hold circuit 32 act as a zero order hold circuit for the first sampling interval and then resume operation as a first order hold circuit in subsequent intervals.

If for some reason return pulse $E_2'$ is not received, then sampling is not initiated as heretofore noted and up-dating of the signal applied to hold circuit 32 is prevented. In this event the extrapolation continues as a linear function having a slope corresponding to the difference between the last and next to the last signal received divided by the sampling interval $T$. The extrapolation is verified analytically in that the extrapolated function $E_o(nT+t)$ in equation (2) is valid for any time $t$, after the last sampling interval $nT$. This indicates that if the range is changing substantially linearly, a few missed rebound pulses $E_2'$ can be tolerated.

In order to protect the system from noise during the period that range information is not being up-dated, and to determine the validity of return pulse $E_2'$, gating means are provided. The validity of pulse $E_2'$ is established if the pulse falls within a boundary determined by the previous rebound pulse $E_2'(N-1)T$ and the maximum distance the range can change during the sampling interval.

In the drawing the gating means is designated generally by the numeral 70 and includes an amplifier 72 connected through a normally open switch 74 to an inverting amplifier 76. Switch 74 is closed by pulse $E_4$ from multivibrator 21. Amplifier 76 has a capacitor 78 connected in feedback relation thereto, with amplifiers 72 and 76, switch 74 and capacitor 78 providing a zero order hold circuit, the operation of which is described in *Electronic Analog and Hybrid Computers*, supra.

The output from integrator 30 representing present range data is applied through amplifier 72, and closed switch 74 to amplifier 76 so that capacitor 78 charges for sampling and storing the integrator output. The output from integrator 30 is applied to a summing means 80 and summed thereby with the output from amplifier 76 in hold circuit 70, and the summed signal applied to a level detector 82. When the summed signal exceeds the previous range signal minus a predetermined voltage reference provided by a battery 84, level detector 82 provides an output which triggers a monostable multivibrator 86. Multivibrator 86 provides a pulse $E_6$ which is applied to gate 24 to disable gate 24 whereby the system does not respond to false or missing laser rebound pulses $E_2'$. Since pulse $E_6$ provided by multivibrator 86 may have a width of 2 to 3 $\mu$ seconds at a lasing rate of 4 pulses per second (a period of $250,000\mu$ second) an improvement in the signal-to-noise ratio of about 100 db. results.

The output from hold circuit 32 corresponds to target range. A voltage proportional to an arbitrary preset range is applied to a differential amplifier 90 and subtracted thereby from the output of hold circuit 32. The output of differential amplifier 90 corresponds to the distance to the preset range. When this output reaches zero, a level detector 92 is triggered providing a command for initiating a weapons release mechanism. The target range and preset range outputs are applied to display means (not shown) for indicating purposes.

It is seen from the aforegoing description of the present invention that the use of a first order data hold network provides linear extrapolation of range data. The use of the range gate as described provides protection against missed or false laser rebound pulses as well as for noise immunization. Moreover, an automatic weapons release capability is imparted to the computer with no additional circuitry.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A ranging system comprising:
   means for providing signals corresponding to the interval between signals transmitted to a target and corresponding rebound signals from the target, said provided signals corresponding to target range;
   means connected to the target range signal means for sampling and storing the signals therefrom during the interval between transmitted signals and for providing an updated signal:
   means connected to the sampling and storing means and to the first mentioned means and affected by the first mentioned means for providing initial condition logic to the sampling and storing means;
   means connected to the first mentioned means, to the sampling and storing means and to the last mentioned means for preventing sampling and storing and signal updating when the rebound signals occur outside of a predetermined interval determined by the last mentioned means;
   means connected to the sampling and storing means for utilizing the updated signal therefrom;
   means for providing a signal corresponding to a predetermined range point; and
   means connected to the sampling and storing means and to the predetermined range point signal means for providing a condition command signal when the sum of the signals from the sampling and storing means and the predetermined range point signal means is at a predetermined level.

2. A system as described by claim 1 wherein the means for providing signals corresponding to the interval between signals transmitted to a target and corresponding rebound signals from the target, said provided signals corresponding to target range, comprises:

means for providing a trigger signal;

means connected to the trigger signal means and responsive to the signal therefrom for providing signals corresponding to the transmitted and rebound signals;

a first oscillator connected to said last mentioned means for providing a first pulse in response to the signals therefrom;

means for providing a reference voltage;

an integrator;

a normally open first switch connected to the reference voltage means, to the first oscillator and to the integrator, and closed by the first pulse from the first oscillator for applying the reference voltage to the integrator; and a normally open second switch connected to the integrator and to the trigger signal means and closed by the trigger signal for setting the integrator whereupon the integrator provides an output which increases to the level of the reference voltage, said output corresponding to the interval between the transmitted and rebound signals and corresponding to target range.

3. A system as described by claim 2, wherein the first oscillator includes:

a flip-flop responsive to the signal corresponding to the transmitted signal so as to be set thereby;

gating means responsive to the signal corresponding to the rebound signal for providing a reset pulse; and the flip-flop being connected to the gating means so as to be reset by the reset pulse therefrom whereupon the flip-flop provides the first pulse.

4. A system as described by claim 2, wherein the means connected to the target range signal means for sampling and storing the signals therefrom during the interval between transmitted signals and for providing an updated signal includes:

a first amplifier connected to the target range signal means;

a first inverting amplifier;

a normally open third switch for connecting the first amplifier to the first inverting amplifier;

a first capacitor connected in feedback relation to the first inverting amplifier;

a second oscillator connected to the first oscillator for providing a second pulse in response to the first pulse; and the third switch being connected to the second oscillator so as to be closed by the second pulse therefrom whereupon the first capacitor charges during a predetermined interval to the level of the target range signal, said third switch being opened upon termination of the second pulse so that the capacitor holds to the charge accumulated thereon.

5. A system as described by claim 4, wherein:

the first inverting amplifier is connected through a resistor in unity gain feedback relation to the first amplifier for controlling the level of the charge on the first capacitor.

6. A system as described by claim 4 wherein the means connected to the sampling and storing means and to the first mentioned means for providing initial condition logic to the sampling and storing means includes:

a third oscillator connected to the trigger signal means and set by the signal therefrom for providing a third pulse;

a second amplifier connected to the first inverting amplifier;

a normally closed fourth switch, a resistor and a second capacitor connecting the second amplifier intermediate the third switch and the first inverting amplifier;

a normally open fifth switch connected across the resistor; and the fourth switch and the fifth switch connected to the third oscillator so as to be opened and closed, respectively, by the third pulse therefrom, whereupon the resistor is shorted to ground and the first capacitor charges to a voltage corresponding to initial range and a condition is established on the second capacitor proportional to initial range.

7. A system as described by claim 6, wherein:

the third oscillator is connected to the second oscillator so as to be reset by the second pulse therefrom.

8. A system as described by claim 4, wherein the means connected to the first mentioned means, to the sampling and storing means and to the last mentioned means for preventing sampling and storing and signal updating when the rebound signals occur outside of a predetermined interval determined by the last mentioned means includes:

a third amplifier connected to the integrator;

a second inverting amplifier having a third capacitor connected in feedback relation thereto;

a sixth normally open switch connecting the third amplifier to the second inverting amplifier, and connected to the second oscillator so as to be closed by the second pulse therefrom whereupon the third capacitor charges to the integrator output;

means for summing the integrator output and the output of the second inverting amplifier;

means responsive to the summation signal at a predetermined level for providing a controlling pulse; and the first mentioned means being connected to the controlling pulse means so as to be disabled by the controlling pulse whereby the first mentioned means does not respond to rebound pulses outside of a predetermined interval determined by the second oscillator.

9. Apparatus as described by claim 1, including:

means for providing a signal corresponding to a predetermined range point; and means connected to the sampling and storing means and to the predetermined range point signal means and responsive to the signals therefrom for indicating range to the predetermined range point.

* * * * *